US012632687B2

(12) United States Patent　　(10) Patent No.: US 12,632,687 B2
Karafotis et al.　　(45) Date of Patent:　May 19, 2026

(54) HIDDEN MAGNETIC STRIPE CARDS AND METHOD THEREFOR

(71) Applicant: THALES DIS FRANCE SAS, Meudon (FR)

(72) Inventors: Stéphane Karafotis, Saint Maximin la Sainte Baume (FR); Laurence Ansaldi, Aubagne (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 18/997,542

(22) PCT Filed: Jul. 24, 2023

(86) PCT No.: PCT/EP2023/070413
　　§ 371 (c)(1),
　　(2) Date: Jan. 22, 2025

(87) PCT Pub. No.: WO2024/023002
　　PCT Pub. Date: Feb. 1, 2024

(65) Prior Publication Data
　　US 2026/0030472 A1　　Jan. 29, 2026

(30) Foreign Application Priority Data
　　Jul. 25, 2022　(EP) .................................... 22306108

(51) Int. Cl.
　　*B32B 3/14*　　(2006.01)
　　*B32B 7/025*　　(2019.01)
　　*G06K 19/06*　　(2006.01)

(52) U.S. Cl.
　　CPC .......... *G06K 19/06196* (2013.01); *B32B 3/14* (2013.01); *B32B 7/025* (2019.01);
　　(Continued)

(58) Field of Classification Search
　　CPC .. B32B 3/025; B32B 3/14; B32B 3/18; B32B 3/22; G06K 19/06196
　　See application file for complete search history.

(56) References Cited

U.S. PATENT DOCUMENTS 4,852,911 A　　8/1989　Hoppe

FOREIGN PATENT DOCUMENTS

DE　　　2752337 A1　　6/1978
DE　　102006023084 A1　　11/2007
　　　　　　(Continued)

OTHER PUBLICATIONS

International Search Report (PCT/ISA/210) and Written Opinion (PCT/ISA/237) mailed on Oct. 13, 2023, by the European Patent Office as the International Searching Authority for current International Application No. PCT/EP2023/070413—[16 pages].

*Primary Examiner* — Elizabeth E Mulvaney

(57)　　　　ABSTRACT

Provided is a hidden magnetic stripe card and method of personalization, which comprises a personalized medium that includes at least a core layer, a magnetic stripe on the core layer, and an opaque silk-screening layer above the magnetic stripe that hides the magnetic stripe from view, where the silk-screening layer comprises iron tetroxide combined with ink. In some embodiments, the iron tetroxide comes in the form of a paste or powder having low granulometry. Other embodiments are disclosed.

20 Claims, 3 Drawing Sheets

(52) U.S. Cl.
    CPC ... *B32B 2255/205* (2013.01); *B32B 2307/208*
              (2013.01); *B32B 2307/41* (2013.01); *B32B*
                                      *2425/00* (2013.01)

(56)                    References Cited

FOREIGN PATENT DOCUMENTS

JP          2002293067      *  10/2002
WO      WO2021123625  A1     6/2021

* cited by examiner

50

200

200

200

200

200

HIDDEN MAGNETIC STRIPE CARDS AND METHOD THEREFOR

CROSS-REFERENCE TO RELATED APPLICATIONS

Not applicable.

TECHNICAL FIELD

The present disclosure generally relates to cards with magnetic stripe such as banking cards. More particularly, but not exclusively, the present disclosure relates to card with magnetic stripe that have the magnetic stripe hidden from view.

BACKGROUND

Magnetic stripes or mag stripes, are the dark strip of magnetic material often seen on banking cards, gift cards, loyalty cards, transport cards and membership cards. Mag stripe cards are also used in access control as key cards, as well as on ID cards. They come in two main varieties: high-coercivity (HiCo) and low-coercivity (LoCo).

The High-coercivity magstrips are harder to erase, and are more appropriate for cards that are frequently used or require extended life. Low-coercivity magstrips require a lower amount of magnetic energy to record, reducing their cost. Gift cards, loyalty cards, fundraising cards and membership cards typically utilize a LoCo magstrip. A magnetic stripe card reader can read either type of magnetic stripe. To include a magnetic stripe on a card, but keep it hidden from view involves additional materials and processing. Hiding the card with extra layers of materials can cause the cards to attenuate signals to the point of failing to read or encode information from or to the card. Furthermore, obscuring the card with such additional materials can also cause the card to fail to meet certain international standards such as ISO.

Magnetic stripe cards are typically small, usually credit card sized pieces of material made of plastic or paper that contain data stored on a ferromagnetic strip which can be read using a magnetic stripe reader. They are typically used for banking cards, retail store loyalty cards, gift cards, hotel key cards, staff access cards, parking garage tickets, and train tickets. For many identity cards, security of all information on the card, whether digitally recorded or physical features of the card, is of paramount importance. The security is sometimes tied to some features that reveal whether the media has physically been tampered with. One mechanism for thwarting attempts to tamper with identity cards is lamination. By securing the physical media in a lamination layer that may not be delaminated without destroying the physical pristineness of the media goes very far to protect the security integrity of media. Another way to provide some additional security is to hide the magnetic stripe from view. Hiding the magnetic stripe from view also allows improving visual aspect of the card by providing more surface for the customer artwork. Hiding the magnetic stripe from view with existing overprinting techniques presents a number of issues since the overprinting makes encoding and even reading of the magnetic stripe difficult as suggested above.

Traditionally, to make an electronic document with a hidden magnetic stripe, the magnetic stripe (which is usually black) is applied to a back side of the card, then a masking layer is applied over the magnetic stripe to hide the color of the magnetic stripe. Contrast is seen between the black of the magnetic strip and the color of the support. For this, the masking layer often corresponds for example to a gray layer, for example by a layer produced by printing a silver ink.

Document DE 102006 023084 A1, for example, describes a document, such as a credit card, which has a magnetic layer on one of its surfaces, and a reflective, non-electrically conductive layer placed over the magnetic layer. However, a decoration is generally made on the document surface.

In addition, the decor often includes a base layer, generally white, on which the patterns or illustrations are made.

The magnetic tape is then found not only under the masking layer, but also under the decoration. However, the more the magnetic tape is covered, the more the quality of the response of the magnetic tape is attenuated.

One possibility to improve this drawback is to use a magnetic tape of higher amplitudes, which can for example be obtained by a particular physical structure. Usually, in order to properly mask such a magnetic tape, it is preferable to apply at least one masking layer having a total thickness which is then at least 4 $\mu$m.

With such a magnetic tape, reinforced, all the layers applied from above (ie masking and decorative layer(s)) then represent a thickness generally between approximately 7 $\mu$m and 12 $\mu$m. However, even with a reinforced magnetic tape, it is very difficult to obtain a product whose efficiency of the magnetic tape meets the requirements of ISO standards.

Thus, the effectiveness of a magnetic tape in an electronic document depends not only on the amplitudes of the magnetic tape, but also on the thickness of the various layers that cover the magnetic tape.

In this context, an objective of the present embodiments is to overcome at least in part the aforementioned drawbacks, while also being able to lead to other advantages.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

SUMMARY

In some embodiments, a personalized medium includes a core layer, a magnetic stripe on the core layer, and an opaque silk-screening layer above the magnetic stripe that hides the magnetic stripe from view, where the silk-screening layer comprises iron tetroxide.

In some embodiments, the personalized medium further includes an overlay layer on the core layer, where the magnetic stripe resides directly on the overlay layer.

In some embodiments, the magnetic stripe has a higher remanent magnetization than a standard magnetic stripe.

In some embodiments, the opaque silk-screening layer includes silver solvent ink and white solvent ink combined with the iron tetroxide. In some embodiments, the personalized medium further includes printed artwork over the opaque silkscreening layer. In some embodiments, the personalized medium further includes a varnish layer over the printed artwork and the magnetic stripe. Said varnish layer protects the printed artwork. In some embodiments, the opaque silk-screening layer above the magnetic strip is less than 10 micrometers (µm).

In some embodiments, the opaque silk-screening layer includes a combination of silver and white inks combined with the iron tetroxide in the form of a paste or powder having low granulometry. In some embodiments, the iron tetroxide enables the personalized medium to comply with ISO Specification (ISO7811-6) after a final lamination of the personalized medium.

In some embodiments, a personal medium having a hidden magnetic stripe includes a core layer, an overlay layer on the core layer, a magnetic strip over the overlay layer where the core layer, the overlay layer and the magnetic strip are subject to a first lamination process forming a first laminated element, and an opaque silk-screening layer above the first laminated element that hides the magnetic stripe from view, where the silk-screening layer includes iron tetroxide.

In some embodiments, the magnetic stripe is of a type having high-coercivity. In some embodiments, the opaque silk-screening layer includes silver solvent ink and white solvent ink combined with the iron tetroxide and where the iron tetroxide comes in the form of a paste or powder having low granulometry.

In some embodiments, the personalized medium further includes printed artwork over the opaque silk-screening layer. In some embodiments, the personalized medium further includes a varnish layer over the printed artwork and the magnetic stripe. In some embodiments, the personalized medium further includes at least a front overlay layer and where the first laminated element and the front overlay layer are subject to a second lamination process forming the personalized medium.

In some embodiments, the opaque silk-screening layer above the magnetic strip is less than 10 micrometers (µm). In some embodiments, the opaque silk-screening layer includes a combination of silver and white inks combined with the iron tetroxide in the form of a paste or powder having low granulometry. In some embodiments, the iron tetroxide enables the personalized medium to comply with ISO Specification (ISO7811-6) after the second lamination process forming the personalized medium.

In some embodiments, a method of forming a personalized medium with a hidden magnetic stripe includes the steps of laminating together a core layer, an overlay layer on the core layer, and a magnetic strip over the overlay layer to form a first laminated element, combining iron tetroxide with ink to form an opaque silk-screening layer, overprinting the opaque silk-screening layer above the first laminated element to hide the magnetic stripe from view, printing artwork over the first laminated element, overprinting varnish over the magnetic strip, opaque silkscreening layer, and the artwork, and laminating together the first laminated element with at least a front core and a front overlay.

In some embodiments, the magnetic strip is of a type having high-coercivity and the opaque silk-screening layer includes silver solvent ink and white solvent ink combined with the iron tetroxide and where the iron tetroxide comes in the form of a paste or powder having low granulometry.

BRIEF DESCRIPTION OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. Also in these instances, well-known structures may be omitted or shown and described in reduced detail to avoid unnecessarily obscuring descriptions of the embodiments.

Figure 1:
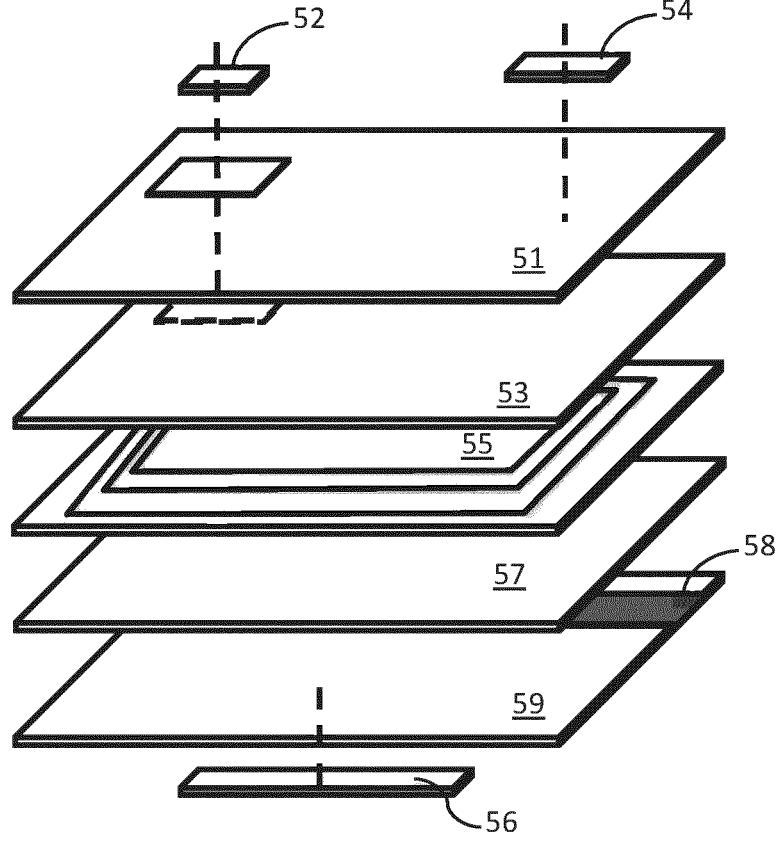
FIG. 1 is an exploded perspective view of a prior art banking card that includes a magnetic stripe that is visible.

FIG. 1 is an exploded perspective view of a prior art banking card 50 that allows some level of personalization of the physical appearance of the card post-issuance, e.g., by the customer. Such a card 50 may, for example, have the following layers:

a transparent overlay layer 59 having a visible magnetic strip 58.

an offset printed back layer 57 that can be made of plastic and including additives and inks;

a core 55 made of plastic with antenna made with aluminum or copper;

an offset printed front 53 made of plastic and including additives and inks;

a transparent overlay layer 51;

a hologram 54;

a contactless chip 52;

a signature panel 56.

With this arrangement, nothing is typically done to block the magnetic stripe 58 from view. If one were to overcoat or silkscreen over the magnetic stripe 58, the typical overcoat or silkscreen will make it ineffective to encode or decode the magnetic stripe.

In order to make a "hidden magstripe" or unseen or invisible magnetic stripe product that continues to operate effectively in accordance with the embodiments, the magnetic stripe can be covered with some specially formulated inks in order to hide it before lamination. An appropriate amount or thickness of inks would need to cover the magnetic stripe without over attenuating the magnetic effects that enables the read and write capabilities of the magnetic stripe. Further, it would be ideal to cover the magnetic stripe to minimize the thickness of ink layers on top of it in order to allow writing/reading & protection of magnetic stripe while conforming to ISO requirements (ISO7811-6). To achieve such objectives, in some embodiments a High Coercivity magnetic stripe. "HiCo" (2750Oe) encoded with a stronger remanent magnetization can be used instead of a standard magnetic stripe. In some embodiments, very opaque inks with a minimum of thickness can be used on the magnetic stripe in order to allow encoding of the magnetic stripe with same magnetic field. In some embodiments, after printing the final product can be protected with a varnish (of minimum thickness). The primary issue when covering the magnetic stripe with silkscreen inks and other layers, it will lose its remanent magnetization and make it difficult to encode (or decode) the magnetic stripe due to the overprinting.

In order to solve or at least alleviate this issue, a new formulation of silkscreen ink (to hide the magnetic stripe) is used in accordance with the embodiments by adding some "paste/powder" of Iron Tetroxide (Fe3O4) of low granulometry which will provide additional magnetic and conductive capabilities. Adding these particles in essence creates a relay between the magnetic stripe and head encoder that would encode the magnetic stripe (or head decoder) that would read the magnetic stripe. In such manner, the magnetic stripe can be hidden or invisible and yet be compliant with ISO specifications (ISO7811-6).

As there is a very low thickness of silkscreen inks on top of the magnetic stripe (typically <10 μm), such arrangement should not have any loss of magnetic performances after final lamination.

FIGS. 2A-2E illustrate the various steps or stages in forming a personalized medium in accordance with the embodiments.

Figure 2A:
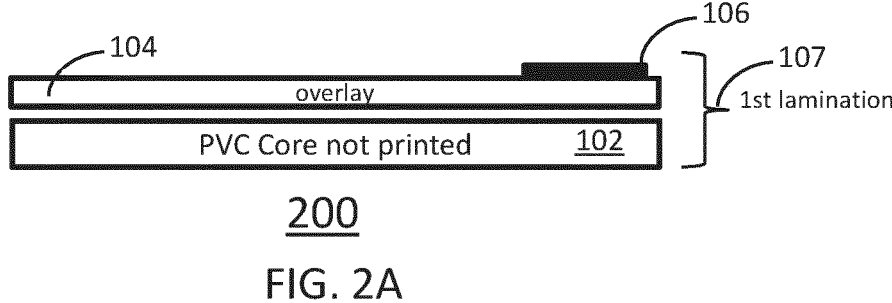
FIG. 2A illustrates a side view of an banking card in accordance with the embodiments after a first lamination.

In some embodiments with reference to FIGS. 2A-2E, a personalized medium 200 includes a core layer 102, a magnetic stripe 106 on the core layer 102, and an opaque silk-screening layer 108 above the magnetic stripe 106 (as shown in FIG. 2A) that hides the magnetic stripe 106 from view, where the silk-screening layer 108 includes iron tetroxide.

Figure 2B:
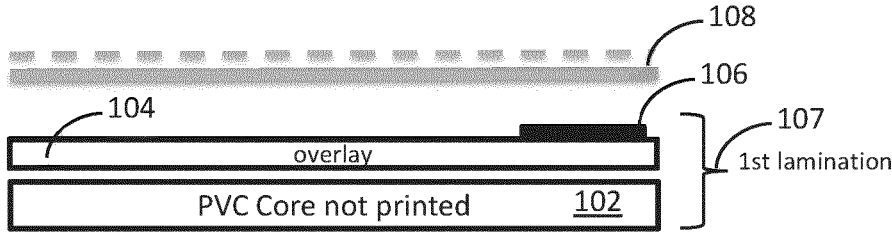
FIG. 2B illustrates an exploded view the banking card of FIG. 2A with silk-screening in accordance with the embodiments

In some embodiments with reference to FIGS. 2A and 2B, the personalized medium 200 further includes an overlay layer 104 on the core layer 102, where the magnetic stripe 106 resides directly on the overlay layer 104. The core layer can be made of a plastic such as PVC.

In some embodiments, the magnetic stripe 106 has a higher remanent magnetization than a standard magnetic stripe.

Figure 2C:
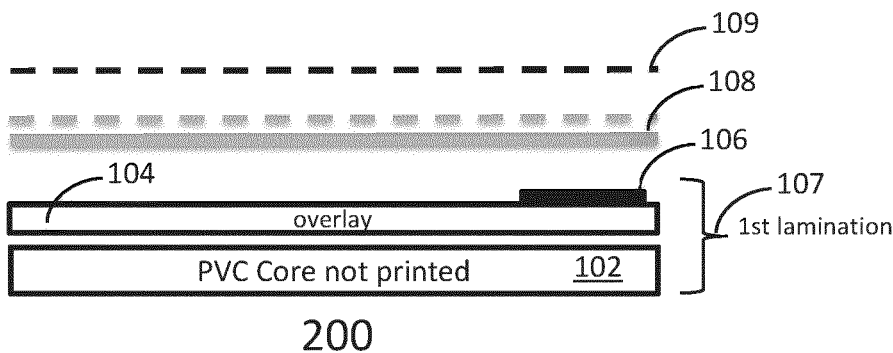
FIG. 2C illustrates an exploded view of the banking card of FIG. 2B with additional artwork printing accordance with the embodiments.

In some embodiments, the opaque silk-screening layer 108 includes silver solvent ink and white solvent ink combined with the iron tetroxide. In some embodiments as shown in FIG. 2C, the personalized medium further includes printed artwork 109 over the opaque silks-screening layer 108. In some embodiments, the personalized medium 200 further includes a varnish layer 110 over the printed artwork 109 and the magnetic stripe 106. In some embodiments, the opaque silk-screening layer 108 above the magnetic strip 106 is less than 10 micrometers (μm).

In some embodiments, the opaque silk-screening layer 108 includes a combination of silver and white inks combined with the iron tetroxide in the form of a paste or powder having low granulometry. In some embodiments, the iron tetroxide enables the personalized medium 200 to comply with ISO Specification (ISO7811-6) standards after a final lamination of the personalized medium.

Figure 2D:
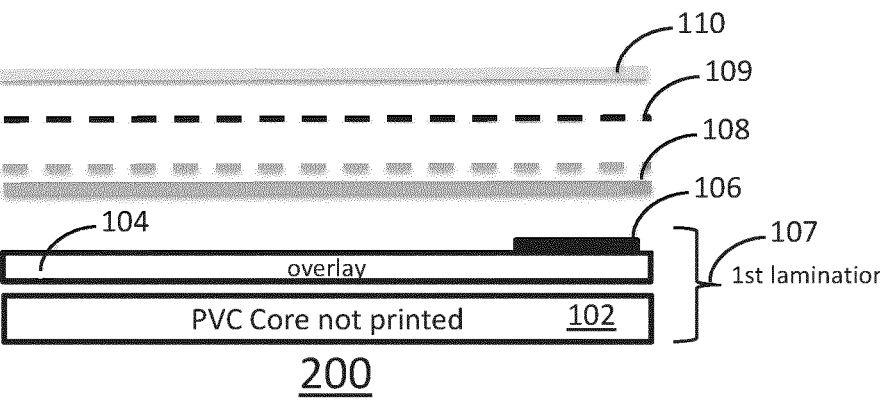
FIG. 2D illustrates an exploded view of the banking card of FIG. 2C with additional overprinting of varnish accordance with the embodiments.
Figure 2E:
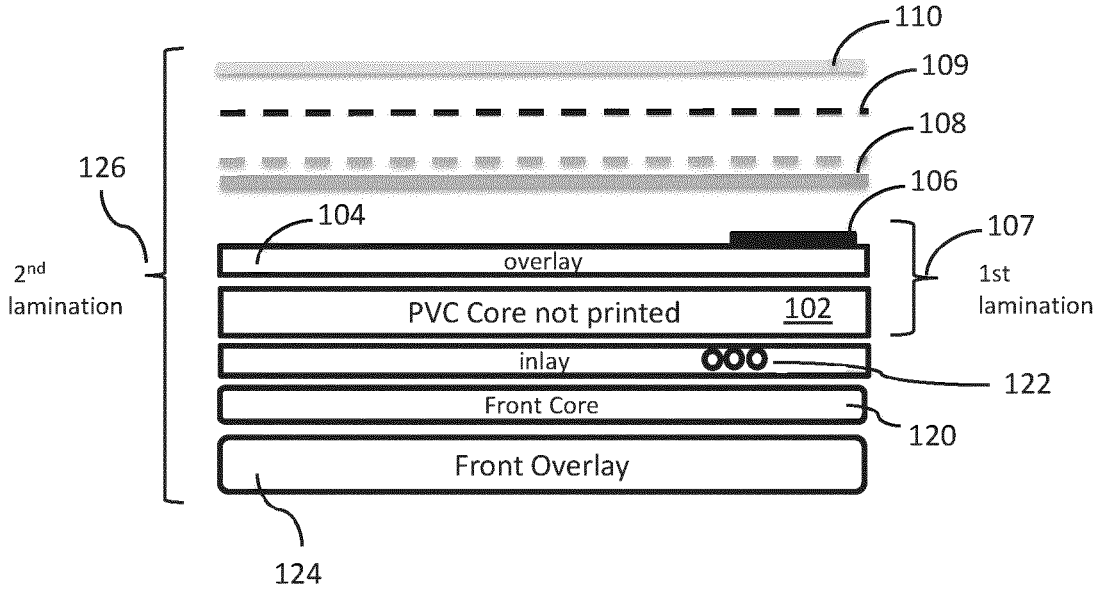
FIG. 2E illustrates an exploded view of the banking card of FIG. 2D further including the steps providing a front core, front overlay and inlay and further providing a second lamination in accordance with the embodiments.

In some embodiments as shown in FIGS. 2D and 2E, a personal medium 200 having a hidden magnetic stripe includes a core layer 102, an overlay layer 104 on the core layer 102, a magnetic stripe 106 over the overlay layer 104 where the core layer 102, the overlay layer 104 and the magnetic stripe 106 are subject to a first lamination process forming a first laminated element 107, and an opaque silk-screening layer 108 above the first laminated element 107 that hides the magnetic stripe 106 from view, where the silk-screening layer 108 includes iron tetroxide.

In some embodiments, the magnetic stripe 106 is of a type having high-coercivity. In some embodiments, the opaque silk-screening layer 108 includes silver solvent ink and white solvent ink combined with the iron tetroxide and where the iron tetroxide comes in the form of a paste or powder having low granulometry.

In some embodiments, the personalized medium 200 further includes printed artwork 109 over the opaque silk-screening layer 108. In some embodiments, the personalized medium 200 further includes a varnish layer 110 over the printed artwork 109 and the magnetic stripe 106. In some embodiments as shown in FIG. 2E, the personalized medium 200 further includes at least a front overlay layer 124 and where the first laminated element 107 and the front overlay layer 124 are subject to a second lamination process 126 forming the personalized medium 200.

In some embodiments, the opaque silk-screening layer 108 above the magnetic strip 106 is less than 10 micrometers (μm). In some embodiments, the opaque silk-screening layer 108 includes a combination of silver and white inks combined with the iron tetroxide in the form of a paste or powder having low granulometry. In some embodiments, the iron tetroxide enables the personalized medium 200 to comply with ISO Specification (ISO7811-6) after the second lamination process 126 forming the personalized medium.

In some embodiments with reference to FIG. 2E, a method of forming a personalized medium 200 with a hidden magnetic stripe includes the steps of laminating (107) together a core layer 102, an overlay layer 104 on the core layer 102, and a magnetic stripe 106 over the overlay layer 104 to form a first laminated element 107, combining iron tetroxide with ink to form an opaque silk-screening layer 108, overprinting the opaque silk-screening layer 108 above the first laminated element 107 to hide the magnetic stripe 106 from view, printing artwork 109 over the first laminated element 107, overprinting varnish 110 over the magnetic stripe 106, opaque silk-screening layer 108, and the artwork 109, and laminating together (126) the first laminated element 107 with at least a front core 120 and a front overlay 124. In some embodiment, the method of forming a personalized medium 200 with a hidden magnetic stripe includes the step of laminating together (126) the first laminated element 107 with at least an inlay comprising an antenna 122, a front core 120 and a front overlay 124.

In some embodiments, the magnetic stripe 106 is of a type having high-coercivity and the opaque silk-screening layer 108 includes silver solvent ink and white solvent ink combined with the iron tetroxide and where the iron tetroxide comes in the form of a paste or powder having low granulometry.

In the absence of any specific clarification related to its express use in a particular context, where the terms "substantial" or "about" or "usually" in any grammatical form are used as modifiers in the present disclosure and any appended claims (e.g., to modify a structure, a dimension, a measurement, or some other characteristic), it is understood that the characteristic may vary by up to 30 percent.

The terms "include" and "comprise" as well as derivatives thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Unless the context requires otherwise, throughout the specification and claims which follow, the word "comprise" and variations thereof, such as, "comprises" and "comprising," are to be construed in an open, inclusive sense, e.g., "including, but not limited to."

Reference throughout this specification to "one embodiment" or "an embodiment" or "some embodiments" and variations thereof mean that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or idea.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

As the context may require in this disclosure, except as the context may dictate otherwise, the singular shall mean the plural and vice versa. All pronouns shall mean and include the person, entity, firm or corporation to which they relate. Also, the masculine shall mean the feminine and vice versa.

When so arranged as described herein, each computing device or processor may be transformed from a generic and unspecific computing device or processor to a combination device comprising hardware and software configured for a specific and particular purpose providing more than conventional functions and solving a particular technical problem with a particular technical solution. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

The headings and Abstract of the Disclosure provided herein are for convenience only and do not limit or interpret the scope or meaning of the embodiments. The various embodiments described above can be combined to provide further embodiments. Aspects of the embodiments can be modified, if necessary to employ concepts of the various patents, application and publications to provide further embodiments.

The invention claimed is:

1. A personalized medium, comprising:
a core layer;
a magnetic stripe on the core layer; and
an opaque silk-screening layer above the magnetic stripe that hides the magnetic stripe from view, wherein the silk-screening layer comprises iron tetroxide.

2. The personalized medium of claim 1, further comprising an overlay layer on the core layer, wherein the magnetic stripe resides directly on the overlay layer.

3. The personalized medium of claim 1, wherein the magnetic stripe has a higher remanent magnetization than a standard magnetic stripe.

4. The personalized medium of claim 1, wherein the opaque silk-screening layer comprises silver solvent ink and/or white solvent ink combined with the iron tetroxide.

5. The personalized medium of claim 1, further comprising printed artwork over the opaque silk-screening layer.

6. The personalized medium of claim 5, further comprising a varnish layer over the printed artwork and the magnetic stripe.

7. The personalized medium of claim 1, wherein the opaque silk-screening layer above the magnetic strip is less than 10 micrometers (μm).

8. The personalized medium of claim 1, wherein the opaque silk-screening layer comprises a combination of silver and white inks combined with the iron tetroxide in the form of a paste or powder having low granulometry.

9. The personalized medium of claim 8, wherein the iron tetroxide enables the personalized medium to comply with ISO Specification (ISO7811-6) after a final lamination of the personalized medium.

10. A personal medium having a hidden magnetic stripe, comprising core layer;
an overlay layer on the core layer;
a magnetic stripe over the overlay layer, wherein the core layer, the overlay layer and the magnetic stripe are subject to a first lamination process forming a first laminated element;
an opaque silk-screening layer above the first laminated element that hides the magnetic stripe from view, wherein the silk-screening layer comprises iron tetroxide.

11. The personalized medium of claim 10, wherein the magnetic stripe has a higher remanent magnetization than a standard magnetic stripe.

12. The personalized medium of claim 10, wherein the opaque silk-screening layer comprises silver solvent ink and/or white solvent ink combined with the iron tetroxide and wherein the iron tetroxide comes in the form of a paste or powder having low granulometry.

13. The personalized medium of claim 10, further comprising printed artwork over the opaque silk-screening layer.

14. The personalized medium of claim 13, further comprising a varnish layer over the printed artwork and the magnetic stripe.

15. The personalized medium of claim 14, further comprising at least a front overlay layer and wherein the first laminated element and the front overlay layer are subject to a second lamination process forming the personalized medium.

16. The personalized medium of claim 10, wherein the opaque silk-screening layer above the magnetic stripe is less than 10 micrometers (μm).

17. The personalized medium of claim 10, wherein the opaque silk-screening layer comprises a combination of silver and white inks combined with the iron tetroxide in the form of a paste or powder having low granulometry.

18. The personalized medium of claim 15, wherein the iron tetroxide enables the personalized medium to comply with ISO Specification (ISO7811-6) after the second lamination process forming the personalized medium.

19. A method of forming a personalized medium with a hidden magnetic stripe, comprising the steps of:

laminating together a core layer, an overlay layer on the core layer, and a magnetic strip over the overlay layer to form a first laminated element;

combining iron tetroxide with ink to form an opaque silk-screening layer;

overprinting the opaque silk-screening layer above the first laminated element to hide the magnetic stripe from view;

printing artwork over the first laminated element;

overprinting varnish over the magnetic stripe, opaque silkscreening layer, and the artwork; and laminating together the first laminated element with at least a front core and a front overlay.

20. The method of claim 19, wherein the having magnetic stripe is of a type having high-coercivity and the opaque silk-screening layer comprises silver solvent ink and white solvent ink combined with the iron tetroxide and wherein the iron tetroxide comes in the form of a paste or powder having low granulometry.

\* \* \* \* \*